United States Patent [19]
Simeth

[11] 3,972,413
[45] Aug. 3, 1976

[54] CHAIN CONVEYOR FOR PRINTING PRESSES

[75] Inventor: Claus Simeth, Offenbach, Germany

[73] Assignee: Roland Offsetmaschinenfabrik Faber & Schleicher AG, Germany

[22] Filed: May 20, 1975

[21] Appl. No.: 579,192

[30] Foreign Application Priority Data

May 22, 1974 Germany .......................... 23424917

[52] U.S. Cl. ................................ 198/180; 101/232; 271/204

[51] Int. Cl.[2] ............................................ B65G 19/00

[58] Field of Search .................... 198/179, 180, 131; 101/232; 271/204–206, 277; 214/1 BA

[56] References Cited

UNITED STATES PATENTS

| | | | |
|---|---|---|---|
| 3,389,657 | 6/1968 | Schwabach | 198/180 |
| 3,786,909 | 1/1974 | Reda | 198/131 |
| 3,809,210 | 5/1974 | Anderson | 198/129 |

FOREIGN PATENTS OR APPLICATIONS

| | | | |
|---|---|---|---|
| 1,112,535 | 8/1961 | Germany | 198/180 |

*Primary Examiner*—Evon C. Blunk
*Assistant Examiner*—Joseph E. Valenza
*Attorney, Agent, or Firm*—Leydig, Voit, Osann, Mayer & Holt, Ltd.

[57] ABSTRACT

A conveyor for a printing press of the type employing a pair of spaced-apart roller chains guided for movement about an endless path having straight and curved portions. Carried by the chains in spaced positions are gripper frames each including first and second parallel crossbars carrying grippers and pads respectively, with mounting members at the ends of the crossbars. Adjacent pedestals are provided at the inner surfaces of each of the chains with each of the pedestals being secured to adjacent pairs of the pins in the chains. Each pedestal carries an inwardly facing mounting pin. Registering outwardly facing openings are provided in each of the mounting members for receiving the pins on the adjacent pedestals. One of such openings is snugly fitted to its pin to provide limited rocking movement of the mounting member. The other of such openings is widened to provide limited freedom of lateral movement of its pin in the direction of chain movement thereby to accommodate the change in center-to-center distance which occurs as the chains move between the straight and curved portions of their path.

5 Claims, 5 Drawing Figures

CHAIN CONVEYOR FOR PRINTING PRESSES

A typical chain conveyor for a printing press, in which gripper frames are carried directly by the endless conveyor chains is shown in German Pat. No. 1,112,535. Such conveyors work satisfactorily as long as operating speeds are moderate. However, because of improvements in sheet-fed printing presses it has been possible to increase press speeds quite considerably without sacrifice in printing quality.

At the higher speeds, however, conveyors of conventional construction have not been capable of withstanding the disproportionately increased dynamic stresses, resulting in rapid wear and the need for much greater attention and maintenance. Efforts have been made to reinforce gripper systems of conventional design so as to better tolerate the added stress, but this has been self-defeating since the resultant increase in weight simply increases the dynamic forces.

Efforts were also made to increase the durability of the conveyor by mounting the gripper frames, at each end, in carriages movable in separate endless guideways so that the chains are only called upon to produce tractive effort. However, this approach makes it necessary to provide separate guidance systems for the gripper frames and for the chains substantially increasing the cost and bulk of the installation.

It is, accordingly, an object of the invention to provide a conveyor for a printing press in which spaced gripper frames are supported upon, as well as propelled by, a pair of spaced conveyor chains, which is economical, and which is inherently capable of withstanding the dynamic forces occurring in high speed operation without increase in wear or required maintenance.

More specifically it is an object of the present invention to provide a conveyor in which the gripper frames, rather than being supported directly upon chain elements, are supported upon special pedestals secured to the inside surfaces of the chains, with the pedestals not only providing a mount for the frames but, at the same time, providing reinforcement for the chain itself.

It is a more specific object of the present invention to provide a conveyor in which adjacent pedestals mount respectively adjacent inwardly facing pins of durable construction, the mounting members at the ends of the gripper frames having registering openings for receiving the pins, with one of the openings being fitted to its pin to provide rocking movement while the other opening is widened in the direction of chain movement to accommodate the change in center-to-center distance between the pins which occurs as the chains move between the straight and curved portions of their path.

It is a general object of the invention to provide a conveyor having gripper frames which include crossbars and mounting members, the mounting members being each supported upon a pair of relatively massive pins which are integral with pedestals which are mounted upon, and serve to reinforce, the adjacent wall of the conveyor chain, the pins being fitted into the gripper frames in such a way as to prevent any relative movement of the gripper frames in any direction while nonetheless accommodating the relative movement of the pedestals as the chains move about their endless path.

Other objects and advantages of the invention will become apparent upon reading the attached detailed description and upon reference to the drawings in which.

While the invention has been described herein in connection with a preferred embodiment, it will be understood that I do not intend to be limited to the particular embodiment shown but intend, on the contrary, to cover the various alternative and equivalent constructions included within the spirit and scope of the appended claims.

Figure 1:
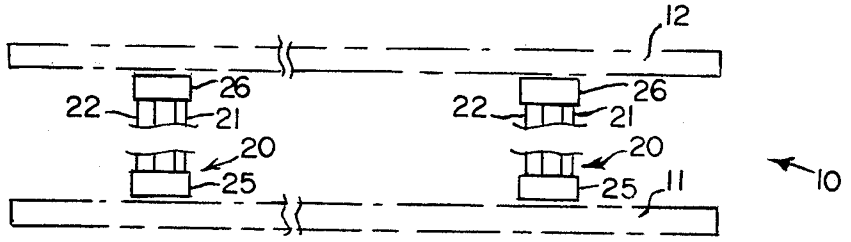
FIG. 1 is a diagrammatic plan view of a printing press conveyor constructed in accordance with the present invention and showing spaced gripper frames.
Figure 2:
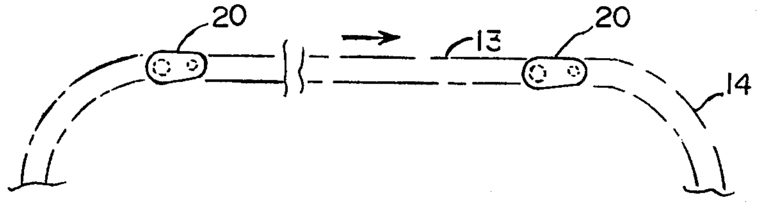
FIG. 2 is a partial diagrammatic elevational view corresponding to FIG. 1.

Turning now to the drawings, FIG. 1 shows a typical printing press conveyor 10 having a pair of roller chains 11, 12 spaced parallel to one another. Conventional guides and sprockets (not shown) serve to guide the chains about an endless path which includes both straight portions 13 and curved portions 14. The chains will be understood to be roller chains formed of overlapping links held together by regularly spaced pins with corresponding pins in the two chains being retained in alined synchronism during the conveying movement.

Transversely arranged between the chains are gripper frames 20. Each includes crossbars 21, 22 respectively mounting grippers and pads, typical grippers and pad being shown at 23, 24 in FIGS. 3–5. The means for operating the grippers, that is, opening and closing the grippers with respect to the pads at particular positions along the path of conveyor movement, does not form a part of the present invention and will be understood to be conventional.

Each gripper frame 20 includes mounting members indicated at 25, 26 for supporting the crossbars, the mounting members, in turn, being supported by the adjacent portions of the respective chains as will be discussed.

Figure 3:
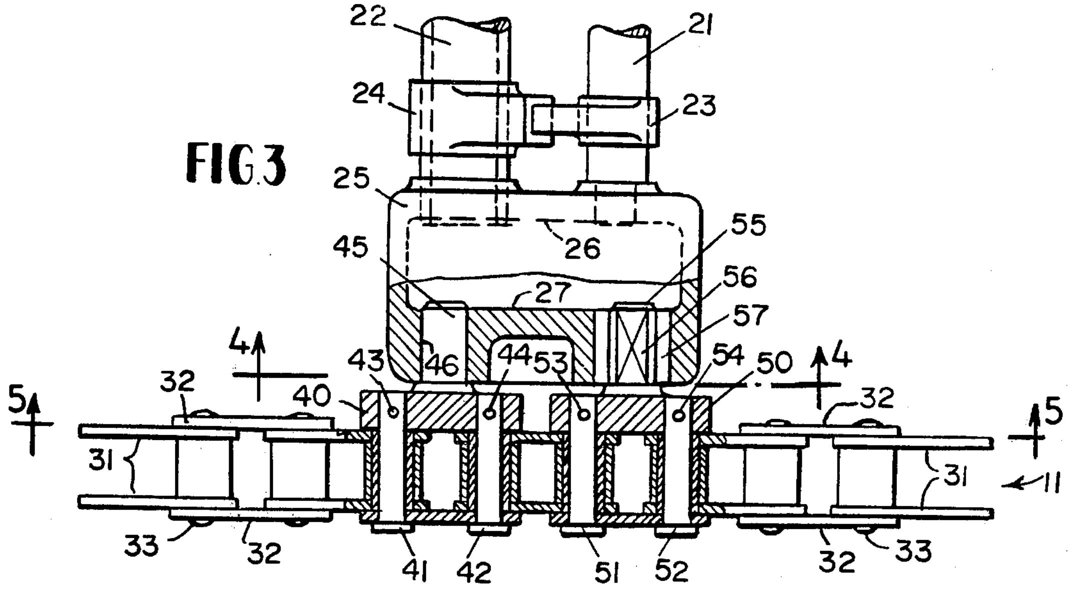
FIG. 3 is a fragmentary plan view showing one end of a gripper frame and the associated portion of chain in partial section, the section being taken along line 3—3 in FIG. 4.
Figure 4:
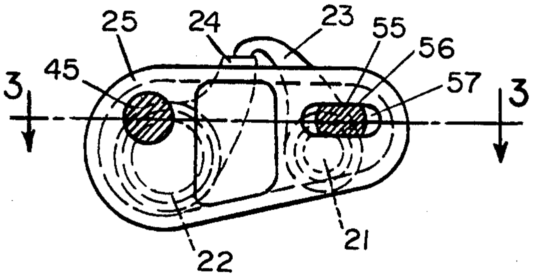
FIG. 4 is a fragmentary section looking along the line 4—4 in FIG. 3.
Figure 5:
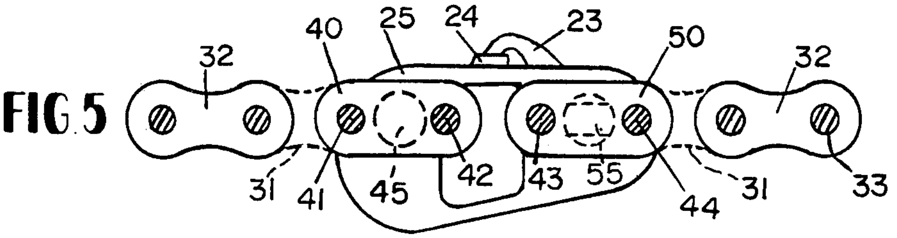
FIG. 5 is a fragmentary section looking along line 5—5 in FIG. 3.

Taking the mounting member 25 shown in FIGS. 3 and 4 by way of example, it will be noted that it is of rigid construction, boxlike in the present instance in order to save weight, having opposed walls 26, 27. The main, stationary crossbar 22 is rigidly mounted in the wall 26 while the companion crossbar 21 is rockably journaled therein for movement of gripper 23. The longitudinal dimension of the mounting member 25 is such as to span a plurality of links of the chain.

Turning now to the chain construction, the chain 11 will be seen, in FIG. 3, to consist of pairs of overlapped inner links 31 and outer links 32 secured together by transversely extending pins 33 and separated by rollers 34.

In accordance with the present invention the chain is reinforced with adjacent relatively massive pedestals, each of the pedestals being secured to adjacent pins of the chain and with each pedestal rigidly supporting an inwardly projecting mounting pin, the mountings pins being received in respective outwardly facing openings formed in the outer wall of the mounting member. Thus there is provided a first pedestal 40 which is secured in place alongside the chain 11 by pins 41, 42, having transverse retaining pins 43, 44. Rigidly supported upon the pedestal 40 is a mounting pin 45 which is, in accordance with the invention, relatively massive as compared to the regular chain pins 33. For receiving the pin 45 and to accommodate rocking movement about the pin axis the mounting member 25 has a bore 46 in which the pin is snugly fitted.

Adjacent the pedestal 40 is a second pedestal 50 lying alongside the chain, and of similar massive construction, being secured in place by pins 51, 52 having transverse retaining pins 53, 54. Rigidly secured to the pedestal 50, and extending parallel to the pin 45, is a mounting pin 55 having flatted sides 56. The pin 55 is registered in an opening 57 in the form of a widened slot having parallel side walls which extend in the direction of movement of the chain.

As a result of the action of two pins 45, 55, the mounting member 25 is captive against movement in any direction. The pins act together to prevent movement of the mounting member out of the plane of the chains while the close fitting of the pin 45 prevents movement of the mounting member at right angles thereto, that is, in the plane of the chains. Nonetheless, because of the limited freedom of lateral movement provided by the slot 57, the change in the center-to-center distance between the pins which occurs as the chain moves between the straight and curved portions of its path is completely accommodated.

It will be apparent, then, that the objects of the invention are amply fulfilled. The pedestals 40, 50, and their pins 45, 55, which are massive as compared to the links and pins of the chain, serve as a durable mounting for the gripper frames, positively supporting and guiding the gripper frames free of any relative or rattling movement and in the face of all the dynamic forces which are generated in high speed operation. The pedestals not only cooperate with one another in support of the gripper frames but serve, as stated, to reinforce that portion of the chain to which the gripper frames are attached. In spite of the special mounting which the present invention provides, commercially available and economically obtained roller chains may be utilized in practicing the invention. The construction, while it is highly durable, long lived and free of maintenance problems is nevertheless inherently simple and economical, being totally chainsupported and hence not requiring any auxiliary guide members with their attendant expense and bulk. The conveyor construction disclosed and claimed herein is highly versatile and may be employed for various sheet or signature conveyance purposes at speeds equal to the highest speeds obtainable in modern printing practice.

I claim:

1. In a conveyor for a printing press, the combination comprising a pair of roller chains formed of overlapping links held together by regularly spaced pins, means for guiding the roller chains in spaced-apart parallel relation about an endless path including straight and curved portions with the corresponding pins in the two chains being retained in respective alinement with one another, a plurality of gripper frames extending bridgingly between the chains, said gripper frames each including first and second parallel cross bars carrying grippers and pads respectively and including mounting members at the ends of the crossbars for mounting the same on the respective chains, the dimension of the mounting members being such that the mounting members span a plurality of links of chain, a pair of adjacent pedestals arranged opposite each of the mounting members the pedestals of each pair being secured to the inside surface of one of the chains and spaced in the direction of chain movement, a mounting pin arranged transversely between each pedestal and the associated mounting member, each of the mounting pins in the pair having a registering opening, one of the mounting pins of the pair being snugly fitted in its opening for lateral captivity in all directions while providing relative rocking movement, the other mounting pin of the pin having an opening which provides limited freedom of lateral movement in the direction of chain movement to accommodate the change in center-to-center distance which occurs as the chains move between the straight and curved portions of their path.

2. In a conveyor for a printing press, the combination comprising a pair of roller chains formed of overlapping links held together by regularly spaced pins, means for guiding the roller chains in spaced-apart parallel relation about an endless path including straight and curved portions with corresponding pins in the two chains being retained in respective alinement with one another, a plurality of gripper frames extending bridgingly between the chains, said gripper frames each including first and second parallel crossbars carrying grippers and pads respectively and including mounting members at the ends of the crossbars for mounting the same on the respective chains, the dimension of the mounting members being such as to span a plurality of links of chain, a pair of inwardly facing pedestals on each of the chains, the pedestals being secured to adjacent pairs of pins in the chain, each of the pedestals carrying an inwardly projecting mounting pin, each mounting member having a pair of mutually outwardly facing openings for registered reception of the mounting pins, one of the openings in each mounting member being dimensioned to snugly embrace its pin for limited rocking movement while the other opening in the mounting member is widened in the direction of chain movement to permit its pin freedom of lateral movement thereby to accommodate the change in center-to-center distance between the pins as the chains move between the straight and curved portions of their path.

3. In a conveyor for a printing press, the combination comprising a pair of roller chains formed of overlapping links held together by regularly spaced transversely extending pins, means for guiding the roller chains in spaced-apart parallel relation about an endless path including straight and curved portions with corresponding pins in the two chains being retained in respective alinement with one another, a plurality of gripper frames extending bridgingly between the chains, said gripper frames each including first and second parallel crossbars carrying grippers and pads respectively and including mounting members at the ends of the crossbars for mounting the same on the respective chains, the dimension of the mounting members being such as to span a plurality of links of chain, adjacent pedestals on each of the chains, the pedestals lying flatly against the chains and each being secured thereon by a pair of adjacent pins of the chain, the pedestals being of relatively massive construction as compared to the links in the chain, the adjacent pedestals mounting respectively adjacent mounting pins extending inwardly into the space between the chains, the mounting pins being rigidly secured to the pedestals and of massive construction as compared to the pins in the chain, the mounting members each having a pair of openings which are mutually outwardly facing and which register with the inwardly facing pins, one of the openings in each mounting member being fitted to its pin for rocking movement about the pin axis while the other opening in the mounting member is fitted with respect to its pin only in one direction, being widened in the other direction to provide limited freedom of lateral movement in the direction of the chain thereby to accommodate the change in center-to-center distance which occurs as the chains move between the straight and curved portions of their path.

4. The combination as claimed in claim 3 in which each of the mounting members is of hollow box-like construction having lateral walls with the crossbars being anchored in one of the walls and with the openings for the pins being formed in the opposite wall, the openings being approximately alined with the respective crossbars.

5. The combination as claimed in claim 3 in which one of the pins is of circular section snugly received in a bore in the mounting member and the other pin is flatted registering in a flat-sided slot in the mounting member, the flat sides of the slot being oriented in the direction of movement of the chains and serving to confine the flatted pin against movement inwardly and outwardly of the plane of the chains while permitting the flatted pin limited freedom of lateral movement in the direction of movement of the chains, thereby to accommodate the change in center-to-center distance which occurs as the chains move between the straight and curved portions of their path.

* * * * *